United States Patent
Ye et al.

(10) Patent No.: US 9,884,252 B2
(45) Date of Patent: Feb. 6, 2018

(54) GAME PROGRAM, CONTROL METHOD FOR COMPUTER, AND COMPUTER

(71) Applicant: GREE, Inc., Tokyo (JP)

(72) Inventors: Ruoyi Ye, Tokyo (JP); Hiroki Kamobayashi, Tokyo (JP)

(73) Assignee: GREE, Inc., Tokyo (JP)

( * ) Notice: Subject to any disclaimer, the term of this patent is extended or adjusted under 35 U.S.C. 154(b) by 159 days.

(21) Appl. No.: 14/805,969

(22) Filed: Jul. 22, 2015

(65) Prior Publication Data

US 2016/0023113 A1    Jan. 28, 2016

(30) Foreign Application Priority Data

Jul. 22, 2014  (JP) .................................. 2014-148960
Mar. 12, 2015  (JP) .................................. 2015-050068

(51) Int. Cl.
G07F 17/32 (2006.01)
A63F 13/537 (2014.01)
A63F 13/211 (2014.01)
A63F 13/92 (2014.01)

(52) U.S. Cl.
CPC .......... *A63F 13/537* (2014.09); *A63F 13/211* (2014.09); *A63F 13/92* (2014.09)

(58) Field of Classification Search
CPC ..................................................... G07F 17/32
See application file for complete search history.

(56) References Cited

U.S. PATENT DOCUMENTS 6,545,661 B1 * 4/2003 Goschy .................. A63F 13/04
345/158
2016/0001174 A1 * 1/2016 Mott ..................... A63F 13/822
463/9

FOREIGN PATENT DOCUMENTS

JP    2011101677 A    5/2011
JP    2011136049 A    7/2011
JP    5715284 B1      5/2015

OTHER PUBLICATIONS

Japanese Office Action dated Jun. 13, 2015 in corresponding Japanese Application No. 2015-050068; 9 pgs.
"Glee, achieved 1.5 million downloads in the new sense of brain games Cubic Tour delivery start from 10 days. Participation in Tokyo Game Show 2014 is also shock decision", Social Game Info, Sep. 8, 2014 updated, Jun. 17, 2016 accessed, URL: http://gamebiz.jp/?p=134367.

(Continued)

Primary Examiner — Omkar Deodhar
(74) Attorney, Agent, or Firm — Maier & Maier, PLLC

(57) ABSTRACT

There is provided a computer that can implement an operation object display output function, a target object display output function, and a form determination function. The operation object display output function can be a function of outputting operation object display information with which an operation object having a certain form is displayed so as to be visible from a certain direction in a graphical scene of a game having three-dimensional information. The target object display output function can be a function of outputting target object display information with which a target object having a form relating to the certain form is displayed. The form determination function may be a function of determining whether the operation object and the target object correspond to each other by comparing the form of the operation object with the form of the target object.

14 Claims, 8 Drawing Sheets

(56) References Cited

OTHER PUBLICATIONS

Japanese Office Action dated Sep. 15, 2015 in corresponding Japanese Application No. 2015-050068; 11 pgs.
Japanese Office Action dated Sep. 24, 2014 in corresponding Japanese Application No. 2014-148960; 4 pgs.
"Kurupita 3D" Rotate and fit a solid figure into a background silhouette, Flash Game Ichinichi Ichizen, Aug. 22, 2012, URL: http://flashgametoday.jp/2012/08/22050000.php.
"Kurupita 3D" Get a sense of achievement—A puzzle game of rotating and fitting a 3D block into a silhouette, Favroid, Oct. 8, 2012, URL: http://favroid.com/free/spgame32/.
Puzzle Game Algorithm Maniacs, Softbank Creative Corp., Jul. 31, 2008, First Printing of First Edition, pp. 123 to 138 and 400.

* cited by examiner

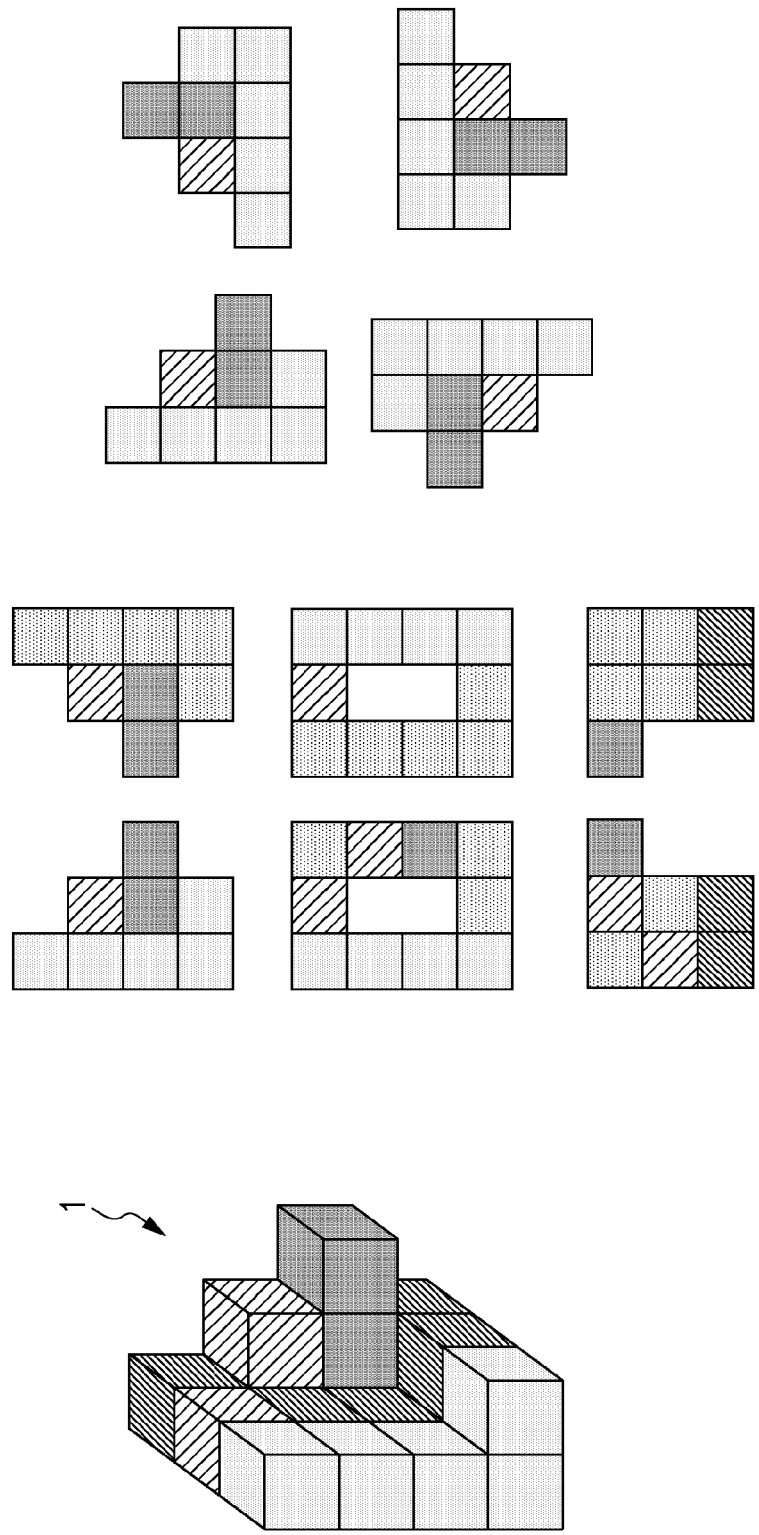

GAME PROGRAM, CONTROL METHOD FOR COMPUTER, AND COMPUTER

FIELD

Exemplary embodiments described herein relate to a game program and so on for performing a process to make a game proceed.

BACKGROUND

With the widespread use of electronic devices, such as smartphones and tablet terminals, games for such electronic devices, in addition to those for home video game machines, are actively being developed. Among a number of games of various genres that are being developed, three-dimensional puzzle games have gained popularity recently, and numerous three-dimensional puzzle games are being developed.

For example, Japanese Unexamined Patent Application Publication No. 2011-101677 discloses a game apparatus that runs a game using eight types of regular hexahedrons which are displayed as three-dimensional computer graphics. Japanese Unexamined Patent Application Publication No. 2011-136049 discloses a puzzle game in which a puzzle is solved by arranging a plurality of displayed images and guessing the whole picture of an object that is present in virtual space.

Existing three-dimensional puzzle games have shortcomings in that their rules and operation are too complicated. For example, the game apparatus described in Japanese Unexamined Patent Application Publication No. 2011-101677 provides a puzzle game in which a plurality of regular hexahedrons having complex regularity are rotated, which is difficult to play. Similarly, in the puzzle game described in Japanese Unexamined Patent Application Publication No. 2011-136049, operations needed to play the puzzle game are complicated, and therefore, the puzzle game is also difficult to play.

Regarding games, such as existing three-dimensional puzzle games, for which players need to understand complicated rules or perform complicated operations, players may hesitate to start playing the games and tend to become tired of continuously playing the games. Accordingly, it is desired to implement a quick enjoyable three-dimensional game by simplifying rules and operation while maintaining the attractiveness of three-dimensional games.

SUMMARY

One exemplary embodiment is made in view of the above-described shortcomings and an objective thereof is to provide a game that is a quick enjoyable game and that has certain attractiveness due to three-dimensional display.

In order to address the above-described shortcomings, a game program according to an aspect of the exemplary embodiment may cause a computer to implement functions including: an operation object display output function of outputting operation object display information with which an operation object having a certain form is displayed so as to be visible from a certain direction in a graphical scene of a game having three-dimensional information; a target object display output function of outputting target object display information with which a target object having a form relating to the certain form is displayed; and a form determination function of determining whether the operation object and the target object correspond to each other by comparing the form of the operation object with the form of the target object.

The game program according to the aspect of the exemplary embodiment may cause the computer to further implement a viewpoint change function of changing the certain direction in accordance with information about a change operation obtained from a player via an input unit.

The game program according to the aspect of the exemplary embodiment may cause the computer to further implement an acceleration obtaining function of obtaining, from an acceleration measurement unit, information about an acceleration to which a terminal operated by the player is being subjected as the information about a change operation which is obtained via the input unit. The viewpoint change function may change the certain direction in accordance with the information about an acceleration obtained by the acceleration obtaining function.

The viewpoint change function may obtain, from the acceleration measurement unit, information about an acceleration to which a terminal operated by the player is being subjected as the information about a change operation which is obtained via the input unit.

In the game program according to the aspect of the exemplary embodiment, the viewpoint change function may change the certain direction so as to make one of a front face, a back face, a left face, a right face, a top face, and a bottom face of the operation object face forward and to orient one of an upper side, a lower side, a left side, and a right side of the one of the faces of the operation object up.

The game program according to the aspect of the exemplary embodiment may cause the computer to further implement a limitation function of placing a limitation on a time period during which the certain direction is changeable by the viewpoint change function and/or on the number of times the certain direction is changeable by the viewpoint change function.

In the game program according to the aspect of the exemplary embodiment, the limitation function may set a time based on a speed at which at least one of the operation object and the target object moves and a distance from the operation object to the target object as a time limit.

In the game program according to the aspect of the exemplary embodiment, the form determination function may determine whether the operation object and the target object correspond to each other by comparing the form of the operation object with the form of the target object and determining whether one of the operation object and the target object fits into the other.

The game program according to the aspect of the exemplary embodiment may cause the computer to further implement an object moving function of moving at least one of the operation object and the target object along at least one of three axes of three dimensions so as to make the operation object and the target object approach each other.

The game program according to the aspect of the exemplary embodiment may cause the computer to further implement a bonus offering function of offering a certain bonus to a player in a case where the form determination function determines that the operation object and the target object correspond to each other.

The game program according to the aspect of the exemplary embodiment may cause the computer to further implement a game proceeding function of making another game relating to the game proceed in a case where the form determination function determines that the operation object and the target object correspond to each other.

In the game program according to the aspect of the exemplary embodiment, the operation object and/or the target object may each be constituted by a plurality of object elements, and each of the plurality of object elements may be associated with attribute information.

In the game program according to the aspect of the exemplary embodiment, the attribute information may be information indicating a form, a color, a pattern, or a combination thereof of each of the plurality of object elements.

In the game program according to the aspect of the exemplary embodiment, the operation object display output function may further output other operation object display information with which the operation object is displayed so as to be visible from another direction different from the certain direction.

The game program according to the aspect of the exemplary embodiment may provide a puzzle game in which a player matches the operation object with the target object by determining the certain direction.

In order to address the above-described shortcomings, a control method for a computer according to an aspect of the exemplary embodiment can include: an operation object display output step of outputting operation object display information with which an operation object having a certain form is displayed so as to be visible from a certain direction in a graphical scene of a game having three-dimensional information; a target object display output step of outputting target object display information with which a target object having a form relating to the certain form is displayed; and a form determination step of determining whether the operation object and the target object correspond to each other by comparing the form of the operation object with the form of the target object.

In order to address the above-described shortcomings, a computer according to an aspect of the exemplary embodiment can include an operation object display output unit that outputs operation object display information with which an operation object having a certain form is displayed so as to be visible from a certain direction in a graphical scene of a game having three-dimensional information; a target object display output unit that outputs target object display information with which a target object having a form relating to the certain form is displayed; and a form determination unit that determines whether the operation object and the target object correspond to each other by comparing the form of the operation object with the form of the target object.

With the game program, the control method for a computer, and the computer according to aspects of the exemplary embodiment, an operation object having a certain form is displayed so as to be visible from a certain direction in a graphical scene of a game having three-dimensional information, a target object having a form relating to the certain form is displayed, and it is determined whether the two objects correspond to each other. Accordingly, the game program and so on produces an effect of providing a game that is a quick enjoyable game and that has certain attractiveness due to three-dimensional display.

BRIEF DESCRIPTION OF THE DRAWINGS

Exemplary

Exemplary

Exemplary

Exemplary

Exemplary FIG. 3 is a schematic diagram illustrating variations in displaying the operation object in a three-dimensional graphical scene.

Exemplary

Exemplary

Exemplary

Exemplary

Exemplary

Exemplary

DETAILED DESCRIPTION

Exemplary embodiments will be described with reference to FIGS. 1 to 9.

A portable terminal (computer) 100 is an information processing apparatus that is able to execute a game program and to perform a process described below. The portable terminal 100 may be any device as long as the device is able to perform the process, is not limited to a specific portable terminal, and may be, for example, a smartphone, a tablet terminal, a home video game machine, a portable telephone, a personal computer, or other electronic devices, as desired.

Figure 2A:
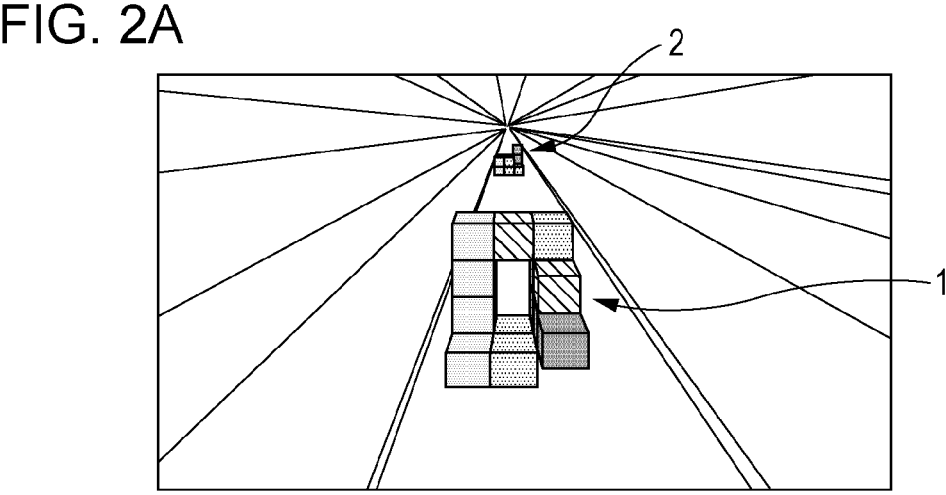
FIG. 2A is a schematic diagram illustrating an example of a game screen displayed on a display unit included in the portable terminal such as a state where a target object is approaching an operation object.
Figure 2B:
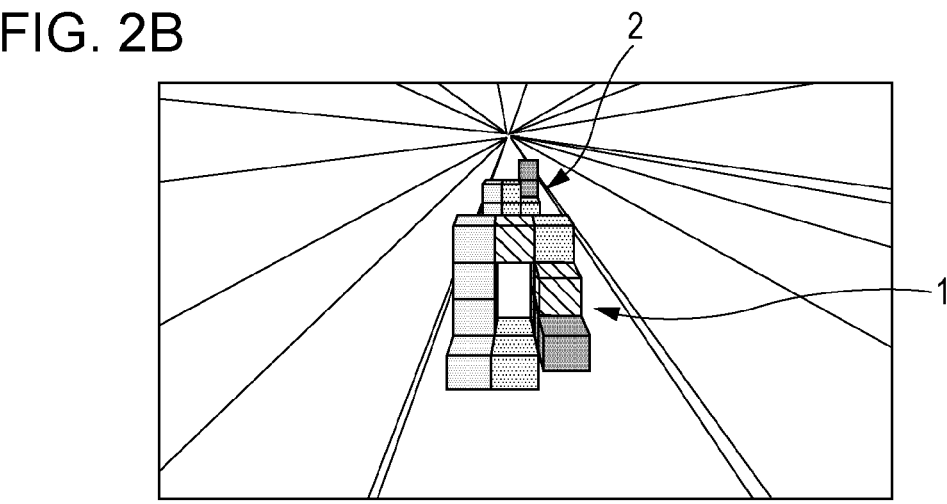
FIG. 2B is a schematic diagram illustrating an example of a game screen displayed on a display unit included in the portable terminal such as a state where the target object is further approaching the operation object.
Figure 2C:
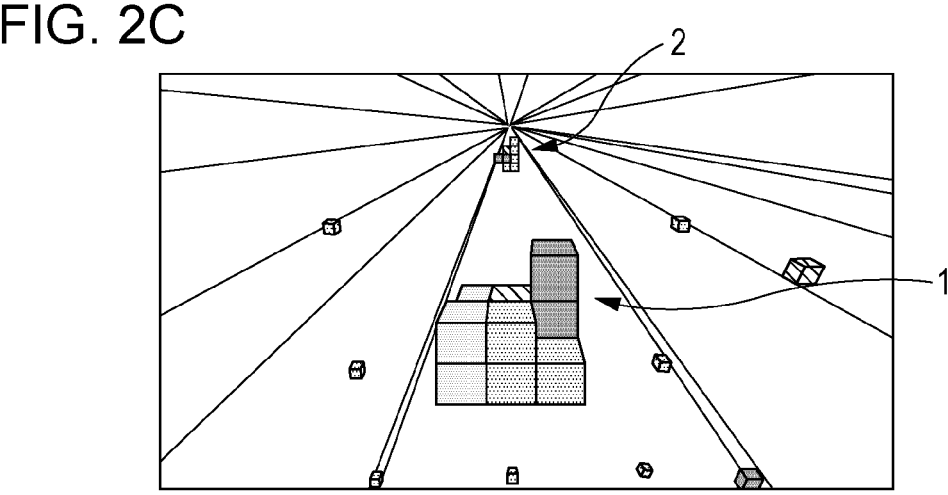
FIG. 2C is a schematic diagram illustrating an example of a game screen displayed on a display unit included in the portable terminal such as a state where a performance of the target object being broken into pieces is displayed when a player matches the attitude of the operation object with the attitude of the target object.

FIGS. 2A to 2C are schematic diagrams illustrating examples of game screens displayed on a display unit 50 included in the portable terminal 100, where exemplary FIG. 2A illustrates a state where a target object 2 is approaching an operation object 1, exemplary FIG. 2B illustrates a state where the target object 2 is further approaching the operation object 1, and exemplary FIG. 2C illustrates a state where a performance of the target object 2 being broken into pieces is displayed when a player matches the attitude of the operation object 1 with the attitude of the target object 2.

As illustrated in exemplary FIGS. 2A to 2C, the portable terminal 100 can display the operation object 1 having a certain form so as to be visible from a certain direction in a graphical scene of the game having three-dimensional information. Similarly, the portable terminal 100 can display the target object 2 (barricade) having a form (similar form, for example) that may relate to part or all of the certain form. The player can input, into an input unit 40, an operation (change operation) for changing the attitude of the operation object 1 to thereby match the attitude of the operation object 1 that is displayed on the near side (on the near side in the depth direction of the game screen displayed on the display unit 50 (e.g. directly in front of the player) with the attitude of the target object 2 that is moving from far in front of the operation object 1 (from the far side in the depth direction of the game screen displayed on the display unit 50) to the near side (that is, approaching the operation object 1).

Exemplary FIG. 3 is a schematic diagram illustrating variations in displaying the operation object 1 in the three-dimensional graphical scene. As illustrated in exemplary FIG. 3, the operation object 1 having a three-dimensional form has six faces (front face, back face, left face, right face, top face, and bottom face), and each face can be oriented in any of four orientations (that is, an upper-side up orientation, a lower-side up orientation, a left-side up orientation, and a right-side up orientation). Therefore, the operation object 1 can be displayed in three dimensions from 24 (=6×4) directions. Similarly, the target object 2 can be displayed in three dimensions from 24 directions. Attitude, which can be interpreted as position, posture, movement or the like, as non-limiting examples.

As illustrated in exemplary FIGS. 2A and 2B, the player may need to find an attitude that matches the attitude (display direction) of the target object 2 from among 24 attitudes (display directions) that the operation object 1 can have. In a case where the player succeeds in finding an attitude that matches the attitude of the target object 2 before the target object 2 hits the operation object 1, the portable terminal 100 can display the performance of the target object 2 being broken into pieces and further can display the subsequent target object 2, as illustrated in exemplary FIG. 2C. Therefore, the player consecutively changes the attitude of the operation object 1 so as to match the attitudes of the target objects 2 that come one after another from the far side of the game screen.

As described in the example above, the player can continue playing the game, for example, only by selecting a certain direction from which the operation object 1 is displayed (by changing the attitude of the operation object 1) in the three-dimensional graphical scene. Accordingly, the portable terminal 100 can provide a game that is a quick enjoyable game and that has certain attractiveness due to three-dimensional display.

Figure 1:
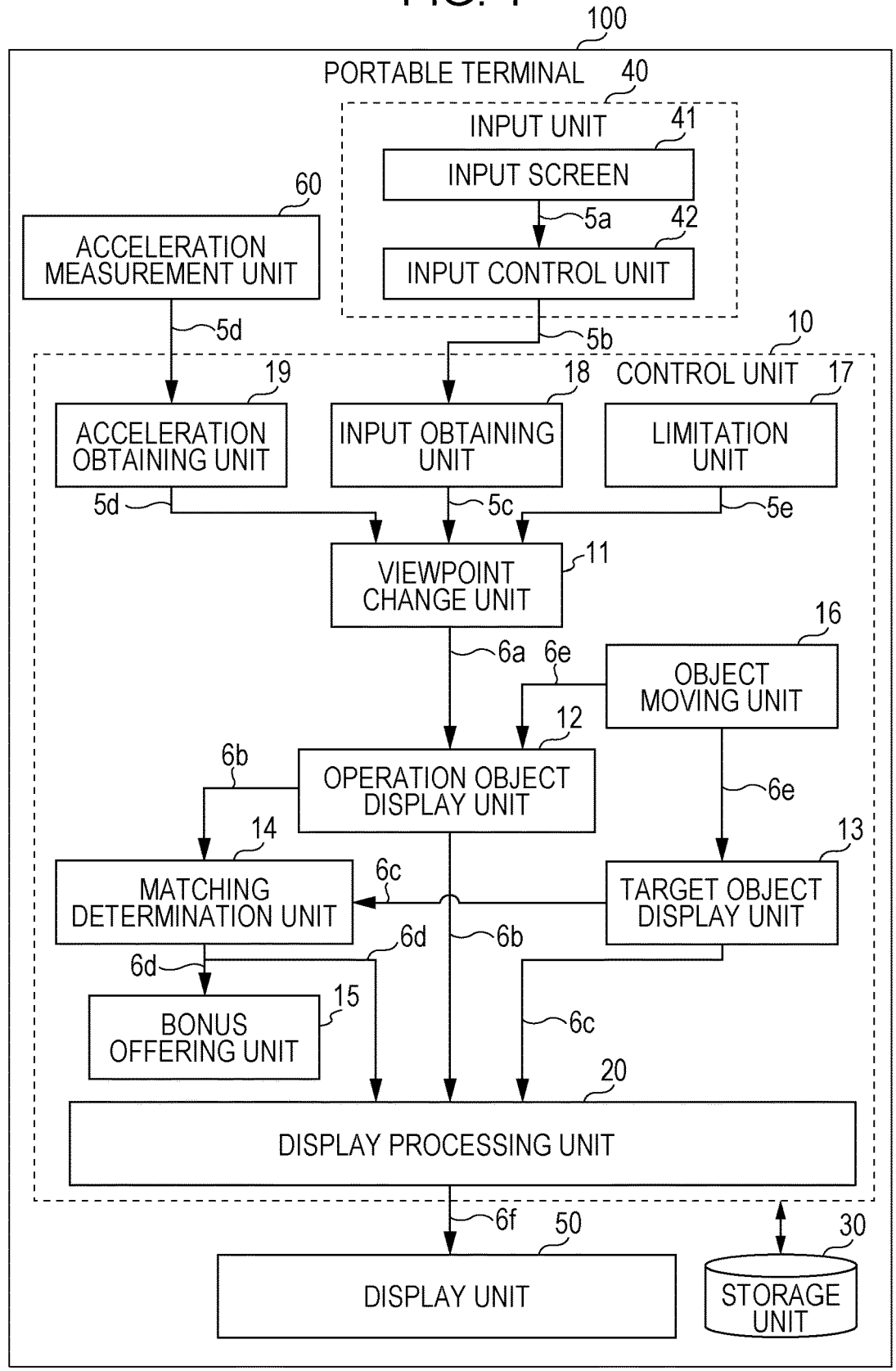
FIG. 1 is a block diagram illustrating a configuration of principal parts of a portable terminal according to an embodiment of the present invention.

Exemplary FIG. 1 is a block diagram illustrating a configuration of principal parts of the portable terminal 100. As illustrated in FIG. 1, the portable terminal 100 can include a control unit 10 (a viewpoint change unit 11, an operation object display unit 12, a target object display unit 13, a matching determination unit 14, a bonus offering unit 15, an object moving unit 16, a limitation unit 17, an input obtaining unit 18, an acceleration obtaining unit 19, and a display processing unit 20), the input unit 40 (an input screen 41 and an input control unit 42), the display unit 50, an acceleration measurement unit 60, and a storage unit 30.

The control unit 10 may entirely control various functions of the portable terminal 100. The control unit 10 can include the viewpoint change unit 11, the operation object display unit 12, the target object display unit 13, the matching determination unit 14, the bonus offering unit 15, the object moving unit 16, the limitation unit 17, the input obtaining unit 18, the acceleration obtaining unit 19, and the display processing unit 20.

The viewpoint change unit (viewpoint change function) 11 can change the certain direction from which the operation object 1 is displayed (the attitude of the operation object 1) in accordance with change information 5c (e.g., information about a change operation) obtained from the player via the input unit 40.

For example, in a case where the change information 5c is input from the input obtaining unit 18, and the change information 5c indicates that a flick input of a top-to-bottom flick on the input screen 41 has been provided, the viewpoint change unit 11 can change the attitude (display direction) of the operation object 1 so that the operation object 1 rotates in a longitudinal direction in accordance with the flick input. Similarly, in a case where the change information 5c indicates that a flick input of a left-to-right flick on the input screen 41 has been provided, the viewpoint change unit 11 can change the attitude of the operation object 1 so that the operation object 1 rotates in a lateral direction in accordance with the flick input. Similarly, in a case where the change information 5c indicates that an input of drawing a circle on the input screen 41 has been provided, the viewpoint change unit 11 can change the attitude of the operation object 1 so that the operation object 1 rotates clockwise or counter-clockwise in accordance with the input.

In other words, the viewpoint change unit 11 changes the certain direction from which the operation object 1 is displayed (the attitude of the operation object 1) so that the operation object 1 can rotate about at least one of the three axes (the X axis, the Y axis, and the Z axis) of three dimensions, in accordance with a change operation performed by the player. Similarly, the viewpoint change unit 11 can change the direction from which the target object 2 is displayed, in accordance with a change operation performed by the player. The viewpoint change unit 11 can output direction information 6a that indicates the changed direction to the operation object display unit 12.

Figure 4:
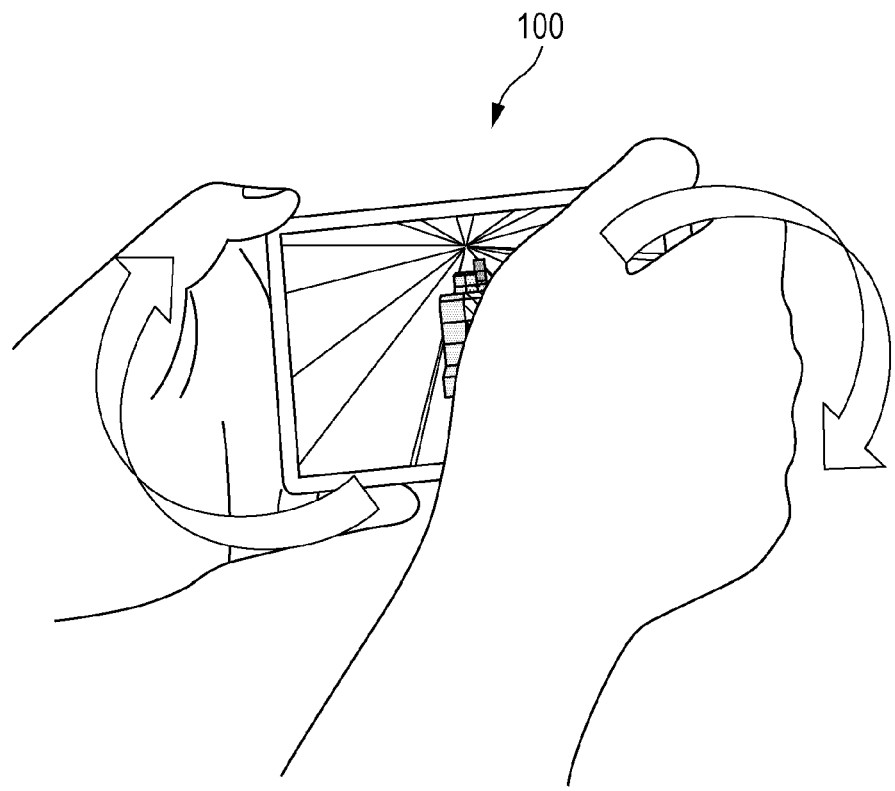
FIG. 4 is a schematic diagram illustrating a state where the player tilts the portable terminal to thereby change a certain direction from which the operation object is displayed.

Exemplary FIG. 4 is a schematic diagram illustrating a state where the player tilts the portable terminal 100 to thereby change the certain direction from which the operation object 1 is displayed. As illustrated in FIG. 4, the viewpoint change unit 11 can change the certain direction in accordance with acceleration information 5d input from the acceleration obtaining unit 19.

For example, in a case where the acceleration information 5d indicates that the display unit 50 is being subjected to an acceleration in a downward direction, the viewpoint change unit 11 changes the attitude (display direction) of the operation object 1 so that the operation object 1 rotates in a longitudinal direction in accordance with the acceleration. Similarly, in a case where the acceleration information 5d indicates that the display unit 50 is being subjected to an acceleration in a rightward direction, the viewpoint change unit 11 can change the attitude of the operation object 1 so that the operation object 1 rotates in a lateral direction in accordance with the acceleration. That is, the viewpoint change unit 11 can change the attitude of the operation object 1 in accordance with a direction in which the portable terminal 100 is tilted. Accordingly, the portable terminal 100 can provide the player with an intuitive operation interface.

The operation object display unit (operation object display output function) 12 can output, to the matching determination unit 14 and to the display processing unit 20, operation object display information 6b with which the operation object 1, having a certain form, can be displayed so as to be visible from the certain direction (direction indicated by the direction information 6a input from the viewpoint change unit 11) in the graphical scene of the game having three-dimensional information.

The target object display unit (target object display output function) 13 can output, to the matching determination unit 14 and to the display processing unit 20, target object display information 6c with which the target object 2 having a related form relating to the certain form is displayed. Here, the "related form" may be, but is not limited to, (1-1) a form similar to the form of the operation object 1, (1-2) a form that includes part of the form of the operation object 1, (1-3) a complementary form that fits into the form of the operation object 1 (like the form of a keyhole into which a key fits), or (1-4) a form that corresponds to part or all of the form of the operation object 1, for example.

It may further be appreciated that the operation object display unit 12 and/or the target object display unit 13 can change (2-1) the form of an object (the operation object 1 and/or the target object 2) and/or (2-2) attribute information that is set for each of a plurality of object elements that constitute the object, at a certain timing. For example, in the case of (2-1) described above, the target object display unit 13 can display the target object 2 so that part or all of the form of the target object 2 expands or contracts. In the case of (2-2) described above, the target object display unit 13 can display the target object 2 so that the color (attribute information) of part, or all, of the target object 2 changes. Accordingly, the player may need to consider the timing at which the player is to match the attitude of the operation object 1 with the attitude of the target object 2, and therefore, the portable terminal 100 can make the game more interesting or provide other desired effects.

The matching determination unit (form determination function) 14 can compare the form of the operation object 1 with the form of the target object 2, for example, to thereby determine whether the operation object 1 and the target object 2 correspond to each other.

For example, in a case where the target object 2 has a form similar to the form of the operation object 1 (in the case of (1-1) described above), the matching determination unit 14 may determine that the operation object 1 matches the target object 2 if the operation object 1 viewed from a first direction (among the six directions in exemplary FIG. 3 from any of which the operation object 1 is visible) and oriented in a first orientation (among the four orientations in exemplary FIG. 3 in any of which the operation object 1 can be oriented) matches the target object 2 viewed from a second direction (among the six directions in exemplary FIG. 3 from any of which the target object 2 is visible) and oriented in a second orientation (among the four orientations in exemplary FIG. 3 in any of which the target object 2 can be oriented). In a case where the target object 2 has a complementary form that fits into the form of the operation object 1 (in the case of (1-3) described above), the matching determination unit 14 can compare the form of the operation object 1 with the form of the target object 2 and can determine whether one of the operation object 1 and the target object 2 fits into the other (whether the operation object 1 fits into a void (a portion displayed as a blank) of the target object 2, for example.

That is, in the exemplary embodiment, the matching determination unit 14 compares the operation object 1 with the target object 2 and determines whether the attitudes (display directions, forms, and the like) of the two objects have a certain relationship (the two objects match, or one of the two objects includes the other, for example). The matching determination unit 14 outputs determination information 6d that includes a result of determination to the bonus offering unit 15.

Note that the matching determination unit 14 can determine whether the attitudes of the two objects have a certain relationship (whether the operation object 1 and the target object 2 correspond to each other) at any timing. For example, the matching determination unit 14 may perform determination each time the player inputs a change operation or may perform determination when the player presses (taps) a "determine" button. In a case where the matching determination unit 14 determines that the two objects correspond to each other, the object moving unit 16 can move the target object 2 in the graphical scene rapidly without stopping.

The bonus offering unit (bonus offering function) 15 can offer a certain bonus to the player in a case where the matching determination unit 14 determines that the two objects correspond to each other. Here, a "certain bonus" may be (3-1) one or more points or (3-2) a character or an item that can be used in the game or in other games, for example. In a case where one or more points are offered to the player (in the case of (3-1) described above), the bonus offering unit 15 can offer more points to the player (a) the shorter the time elapsed before the player finds an attitude of the operation object 1 that matches the attitude of the target object 2 and/or (b) the lower the number of times a change operation is performed in order to find the attitude, for example. In this example, the player can trade the obtained points for an item or the like that can be used in other games.

In another exemplary embodiment, in a case where an item or a character is offered to the player (in the case of (3-2) described above), the bonus offering unit 15 can offer to the player an item or a character that is represented by an image relating to an image displayed on part of the target object 2, for example. Here, in a case where an image of a "ribbon" is attached to the surface of the target object 2, for example, the player plays the game while expecting a character to be obtained that is represented by an image of a "girl" (image relating to the image of a "ribbon") and that can be used in other games. In a case where an image of a "dumb-bell" is attached to the surface of the target object 2, the player plays the game while expecting an item to be obtained that is represented by an image of "increased offensive power" (image relating to the image of a "dumb-bell") and that can be used in other games.

In still another exemplary embodiment, part of an image (a partial image) of a "ribbon" may be attached to the surface of the target object 2, the partial image may be accumulated each time the player clears one target object 2 (in other words, each time the determination information 6d indicating that the two objects correspond to each other is input from the matching determination unit 14), and the bonus offering unit 15 may offer a character that is represented by an image of a "girl" and that can be used in other games to the player in a case where all partial images that constitute the image of a "ribbon" are collected.

As described in the examples above, the portable terminal 100 can offer a bonus to the player in accordance with the progress of the game, and therefore, can increase the player's enthusiasm for playing the game. In particular, in a case where the portable terminal 100 offers an item or a character to the player, it is possible to make the player play the game while giving the player an incentive in the form of the item or the character. Accordingly, the portable terminal 100 can further increase the player's enthusiasm for playing the game.

In an example where the matching determination unit 14 determines that the two objects correspond to each other, the bonus offering unit (game proceeding function) 15 can make another game, relating to the game, proceed. In a case where the other game is a role-playing game (RPG) that unfolds as a character owned by the player battles against an enemy character, for example, the bonus offering unit 15 can produce an effect of doing damage to the enemy character each time the player clears one target object 2, thereby making the player progress in the other game.

In an example where the player plays the game as a sub-game that is part of a certain main game (another game), the bonus offering unit 15 can make the main game proceed such that the progress of the main game varies in accordance with the number of target objects 2 cleared by the player. In an example where the main game is an RPG, as described above, for example, the bonus offering unit 15 can produce an effect of recovering the hit points (health) of the character by a certain amount or can produce an effect of skipping an event in the main game (regarding the event as having been cleared) each time the player clears one target object 2. Accordingly, the portable terminal 100 can increase the player's enthusiasm for playing the other game as well as playing the game.

Note that information about a bonus offered by the bonus offering unit 15 may be uploaded to a server apparatus 200 (described below with reference to exemplary FIG. 9) that is connected to the portable terminal 100 so as to enable communication with each other. Alternatively, a configuration can be employed in which the server apparatus 200 includes the bonus offering unit 15, the portable terminal 100 uploads information about the progress of the game (the number of target objects 2 that have been cleared, for example) to the server apparatus 200, and the bonus offering unit 15 can generate information about a bonus on the server apparatus 200 and stores the information in a certain storage unit.

The object moving unit (object moving function) 16 can move at least one of the operation object 1 and the target object 2 along at least one of the three axes of three dimensions so that the operation object 1 and the target object 2 approach each other.

As illustrated in exemplary FIGS. 2A to 2C, the object moving unit 16 can move the target object 2 displayed far in front of the operation object 1 that is displayed on the near side so that the target object 2 approaches the operation object 1. The object moving unit 16 can output, to the operation object display unit 12 and to the target object display unit 13, movement information 6e for moving the operation object 1 or the target object 2.

It may be noted in some examples that the object moving unit 16 can move the operation object 1 and/or the target object 2 along a certain guide route (a route like a rail that is set in advance). In an example where the target object display unit 13 simultaneously displays a plurality of target objects 2, the player can switch the target object 2 that is currently aimed at to another one by switching between a plurality of guide routes along which the plurality of target objects 2 move respectively. The object moving unit 16 can move the operation object 1 and/or the target object 2 while rotating the operation object 1 and/or the target object 2. In this way, the portable terminal 100 can increase variations of the game.

The certain guide route may have an irregularity. In such examples, the object moving unit 16 can rotate the operation object 1 and/or the target object 2 in accordance with the direction and size of the irregularity at a time point when the operation object 1 and/or the target object 2 reaches the irregularity. The certain guide route may be placed with a certain limitation (may have a narrow portion, for example), and the object moving unit 16 may display the target object 2 such that the target object 2 cannot pass through the certain guide route and approach the operation object 1 unless the player rotates the target object 2 at a specific timing. The portable terminal 100 may decide to terminate the game at the time when the target object 2 fails to pass through the certain guide route or may reduce the time limit by an amount of time during which the target object 2 fails to approach the operation object 1. In this way, the portable terminal 100 can increase variations of the game and the difficulty level of the game, thereby implementing a game that is worth playing even to skilled players.

The limitation unit (limitation function) 17 may place a limitation on a time period during which the certain direction is changeable by the viewpoint change unit 11. In a case where the target object 2 displayed far in front of the operation object 1 that is displayed on the near side moves so that the target object 2 approaches the operation object 1, as illustrated in exemplary FIGS. 2A to 2C, for example, the limitation unit 17 can set a time that is determined on the basis of the speed at which the target object 2 moves and the distance from the operation object 1 to the target object 2 (that is, a time elapsed before the target object 2 hits the operation object 1) as a time limit.

Figure 5:
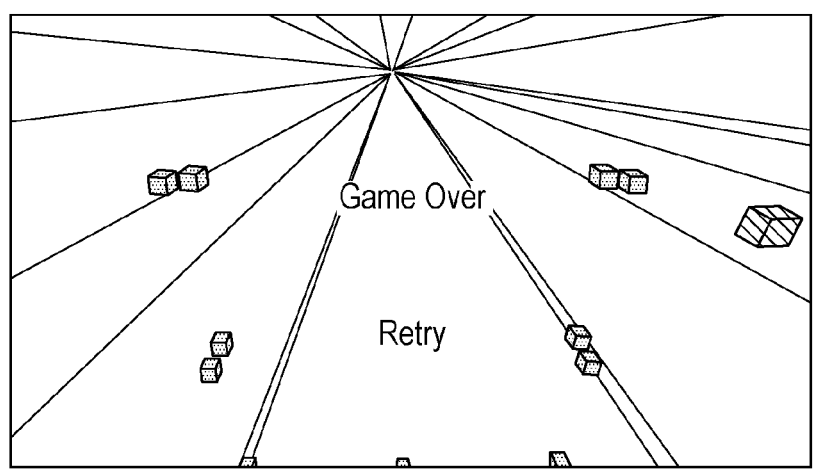
FIG. 5 is a schematic diagram illustrating an example of a game screen displayed in a case where the player fails to find an attitude of the operation object that matches the attitude of the target object and the game is over.

Exemplary FIG. 5 is a schematic diagram illustrating an example of a game screen displayed in a case where the player fails to find an attitude (display direction) of the operation object 1 that matches the attitude of the target object 2 within the time limit and the game is over. As illustrated in exemplary FIG. 5, in the case where the player fails to find an attitude of the operation object 1 that matches the attitude of the target object 2 before the target object 2 hits the operation object 1 (within the time limit), the portable terminal 100 can display a performance of the operation object 1 being broken into pieces and further can display a message notifying the player that the game is over and a message prompting the player to determine whether to play again (retry) the game.

As described in the examples above, the portable terminal 100 can make the player aware of the time limit not by the countdown of the remaining time but in accordance with the speed at which the target object 2 approaches the operation object 1 and the distance between the two objects, for example. Accordingly, the portable terminal 100 can make the player aware of the time limit more intuitively and give a stronger sense of urgency to the player at the time of playing the game.

Similarly, the limitation unit 17 can place a limitation on the number of times the certain direction is changeable by the viewpoint change unit 11. In this case, the limitation unit 17 increments an accumulated number of times a change is made by one each time the player inputs a change operation into the input unit 40. If the player fails to find an attitude of the operation object 1 that matches the attitude of the target object 2 at the time when the accumulated number of times reaches a specific limited number of times, the limitation unit 17 can decide to terminate the game. Further, the limitation unit 17 can display the accumulated number of times a change is made on the game screen to thereby show the player the accumulated number of times. In doing so, the portable terminal 100 can make the player aware of the limited number of times, thereby giving the player a sense of urgency at the time of playing the game.

The limitation unit 17 can place a limitation on a mode in which the certain direction is changeable by the viewpoint change unit 11. For example, the limitation unit 17 can place a limitation on the mode by displaying a certain object that restricts rotation of the operation object 1 (so as to disable rotation of the operation object 1 in a specific direction or to make the operation object 1 rotate two revolutions when a change operation is input only once). In doing so, the portable terminal 100 can give the player a sense of urgency at the time of playing the game. The limitation unit 17 outputs limitation information 5e that includes information about the limited time period, number of times, and/or mode to the viewpoint change unit 11.

The input obtaining unit 18 can obtain a path 5b from the input control unit 42, can generate the change information 5c on the basis of the path 5b, and can output the change information 5c to the viewpoint change unit 11.

The acceleration obtaining unit (acceleration obtaining function) 19 can obtain information (acceleration information 5d) about an acceleration to which a terminal (portable terminal 100) operated by the player is being subjected, from the acceleration measurement unit 60 as the change information 5c (information about a change operation) obtained from the input unit 40, and outputs the acceleration information 5d to the viewpoint change unit 11.

The display processing unit 20 can generate screen information 6f about a game screen on the basis of the operation object display information 6b input from the operation object display unit 12, the target object display information 6c input from the target object display unit 13, and the determination information 6d input from the matching determination unit 14, and can output the screen information 6f to the display unit 50.

The display processing unit 20 can determine whether the target object 2 hits (comes into contact with) the operation object 1 by performing the following process, for example. The display processing unit 20 can determine that the operation object 1 and the target object 2 come into contact with each other if a distance α is smaller than the sum of a distance β1 and a distance β2 (α<β1+β2), the distance α being the distance from a predetermined position indicated by coordinates A (center coordinates of the operation object 1, for example) within an area where the operation object 1 is displayed to a predetermined position indicated by coordinates B (center coordinates of the target object 2, for example) within an area where the target object 2 is displayed, the distance β1 being the distance from the predetermined position indicated by the coordinates A to the outer edge of the operation object 1 (the surface of the area where the operation object 1 is displayed, for example), the distance β2 being the distance from the predetermined position indicated by the coordinates B to the outer edge of the target object 2. In this way, the portable terminal 100 can accurately determine whether the target object 2 comes into contact with the operation object 1.

The input unit 40 can accept a touch operation performed by the player. In this embodiment, the input unit 40 may be a touch panel that is able to detect multi-touch operations. The input unit can 40 include the input screen 41 and the input control unit 42. Note, in exemplary embodiments, that a method for input into the portable terminal 100 is not limited to a touch operation using the touch panel (input can be provided by pressing a certain input key, or any other known or desired manner).

The input screen 41 may be a device (a touch screen included in the touch panel, for example) which is able to detect a position specified by the player performing a touch operation. The input screen 41 can output coordinate information 5a that corresponds to the specified position to the input control unit 42.

The input control unit 42 may obtain the coordinate information 5a from the input screen 41 at a specific time interval and can generate the path 5b from a series of the coordinate information 5a.

The display unit 50 may be a device that displays a game screen. In this embodiment, the display unit 50 may be a liquid crystal display, although any other type of display may be utilized, as desired. Note that, in exemplary FIG. 1, the input unit 40 and the display unit 50 are separately illustrated in order to explicitly indicate functions that the two units respectively have. However, in a case where the input unit 40 is a touch panel, and the display unit 50 is a liquid crystal display, for example, it may be desired that the two units be integrated into one unit.

The acceleration measurement unit 60 may be a device that is able to measure an acceleration (vector quantity that includes the magnitude and orientation) to which the portable terminal 100 is being subjected. The acceleration measurement unit 60 can be implemented as a gyro sensor, or the like, for example.

The storage unit 30 may be a storage device constituted by any recording medium, such as a hard disk, a silicon state drive (SSD), a semiconductor memory, or a digital versatile disc (DVD), or the like, for example, and can store the game program with which the portable terminal 100 is controllable and various types of data.

Figure 6:
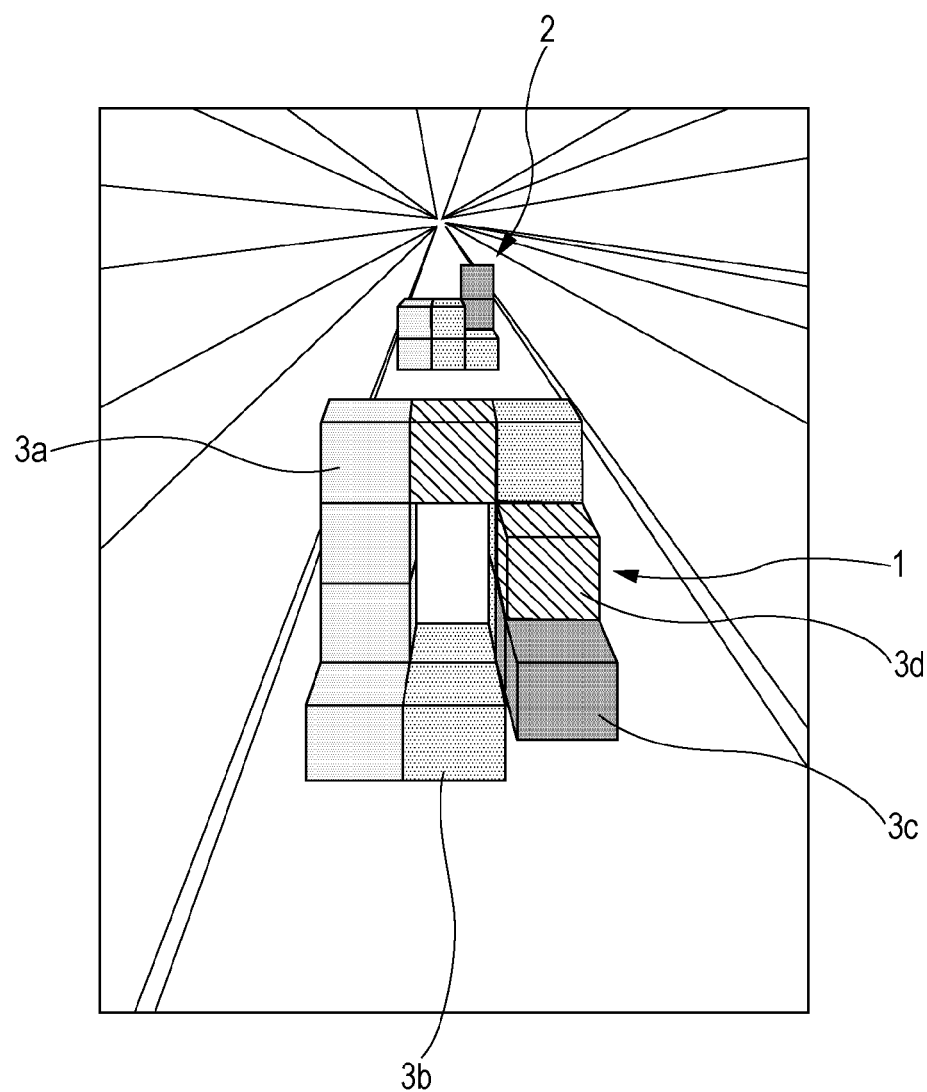
FIG. 6 is a schematic diagram illustrating an example of the operation object that is constituted by a plurality of object elements each associated with attribute information.

Exemplary FIG. 6 is a schematic diagram illustrating an example of the operation object 1 that is constituted by a number of object elements 3 each associated with attribute information. As illustrated in exemplary FIG. 6, the operation object 1 may be constituted by the number of object elements 3 (3a to 3d). Each of the object elements 3 may be associated with attribute information. Here, attribute information can be information that indicates the characteristics (external appearance, for example) of each object element 3, and may be information indicating (4-1) the form of the object element 3, (4-2) the color of the object element 3, (4-3) the pattern of the object element 3, or (4-4) a combination of (4-1) to (4-3). Similarly, the target object 2 can be constituted by a plurality of object elements 3.

In one example, a case is assumed where the operation object 1 is constituted by a number of object elements 3 that are respectively associated with pieces of attribute information indicating different colors, and the target object 2 is constituted by the same number of object elements 3 as the operation object 1, for example. In this case, the player can change the certain direction from which the operation object 1 is displayed by matching the colors of the object elements 3 included in the operation object 1 with the colors of the object elements 3 included in the target object 2. In other words, the portable terminal 100 can give a hint, namely, information about "colors", to the player. Accordingly, the portable terminal 100 can entice the player into playing the game and increase the player's enthusiasm for the game.

Note, in some examples, that attribute information associated with each of the plurality of object elements 3 that constitute the operation object 1 and/or the target object 2 may be information relating to a bonus offered by the bonus offering unit 15. In a case where the plurality of object elements 3 that constitute the target object 2 include an object element 3 associated with a "wood" attribute, and if the player clears the target object 2, for example, the bonus offering unit 15 can offer a bonus relating to the "wood"

attribute (an item that produces an effect of slowing actions of an enemy character, for example) to the player.

Figure 7:
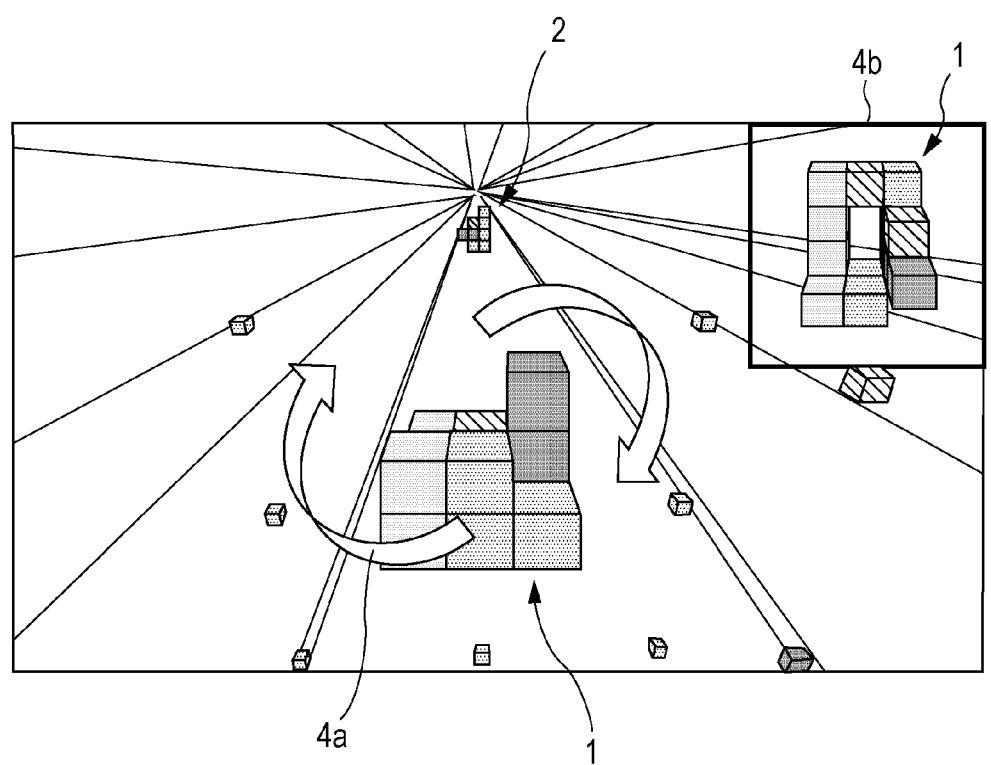
FIG. 7 is a schematic diagram illustrating an example of a game screen on which a hint that explicitly indicates a right rotation direction and a sub-screen on which the operation object is displayed from another direction are further displayed.

Exemplary FIG. 7 is a schematic diagram illustrating an example of a game screen on which a hint 4a that explicitly indicates a right rotation direction and a sub-screen 4b on which the operation object 1 is displayed from another direction are further displayed. As illustrated in exemplary FIG. 7, the portable terminal 100 can display a hint regarding a right direction in which the operation object 1 is to be rotated (that is, a right direction to which the certain direction from which the operation object 1 is displayed is to be changed) in order to match the attitude of the operation object 1 with the attitude of the target object 2. As a result, it may be sufficient that the player inputs a change operation into the portable terminal 100 in accordance with the hint, and therefore, the player can easily play the game even if the player is a beginner. Accordingly, the portable terminal 100 can entice the player into playing the game and increase the player's enthusiasm for the game.

As illustrated in exemplary FIG. 7, the portable terminal 100 can further display the sub-screen 4b on which the operation object 1 is visible from a direction different from the certain direction from which the operation object 1 is displayed. As a result, the player can view the operation object 1 that is displayed in three dimensions from a different angle without changing the certain direction from which the operation object 1 is displayed. Accordingly, the portable terminal 100 can entice the player into playing the game and increase the player's enthusiasm for the game.

Note, in some exemplary embodiments, that the portable terminal 100 may display the target object 2 on the sub-screen 4b instead of the operation object 1 or together with the operation object 1 so as to be visible from a different direction. In this case, the portable terminal 100 may display the target object 2 on the sub-screen 4b such that the target object 2 automatically rotates. Accordingly, the portable terminal 100 can further entice the player into playing the game and further increase the player's enthusiasm for the game.

The portable terminal 100 can display the operation object 1 and/or the target object 2 such that part or all of the operation object 1 and/or the target object 2 is transparent in order, for example, to make the graphical scene easily viewable in the depth direction (direction towards the far side of the game screen). As a result, the player can more easily get a grasp of the form of the operation object 1 and/or the target object 2. Accordingly, the portable terminal 100 can further entice the player into playing the game and further increase the player's enthusiasm for the game.

In an example where the player inputs an operation for using a certain item, the portable terminal 100 can rotate the operation object 1 a specific number of times in directions so as to make the attitude of the operation object 1 match the attitude of the target object 2. In an example where the operation object 1 needs to be rotated five revolutions in a longitudinal direction and/or a lateral direction in order to match the attitude of the operation object 1 with the attitude of the target object 2, for example, the portable terminal 100 can rotate the operation object 1 three revolutions in the directions so as to make the two attitudes match (that is, can automatically solve part of the puzzle). Accordingly, the portable terminal 100 can further entice the player into playing the game and further increase the player's enthusiasm for the game.

In an example where the player inputs an operation for using a certain item, the portable terminal 100 can change attribute information associated with each of the number of object elements 3 that constitute the operation object 1 and/or the target object 2. For example, the portable terminal 100 can change the attribute information so that the number of object elements 3 have distinctively different colors. As a result, the player can more clearly grasp the correspondence between the operation object 1 and the target object 2. Accordingly, the portable terminal 100 can further entice the player into playing the game and further increase the player's enthusiasm for the game.

As described in the examples above, in the portable terminal 100, the game can be designed to lower the difficulty level of the game, and therefore, the portable terminal 100 can provide a game that is quickly played even by beginners.

In another exemplary embodiment, the target object display unit 13 can simultaneously display a number of target objects 2. In this case, the player may need to find a number of attitudes of the operation object 1 that respectively match the attitudes of the plurality of target objects 2 within a time limit that is usually allowed in order to find one attitude of the operation object 1 that matches the attitude of one target object 2. As a result, the portable terminal 100 can increase the difficulty level of the game, thereby implementing a game that is worth playing even to skilled players.

The target object display unit 13 can display the target object 2 so that part or all of the target object 2 is invisible. For example, the amount of light emitted to a route along which the target object 2 moves from the far side to the near side of the game screen may change depending on a position on the route, and the target object 2 may change such that (5-1) the entire target object 2 is visible in a case where the target object 2 is moving through a position on the route to which a large amount of light is emitted, (5-2) only part of the target object 2 is visible (only the form is visible or only the color is visible, for example) in a case where the target object 2 is moving through a position on the route to which a small amount of light is emitted, and (5-3) the target object 2 is invisible in a case where the target object 2 is moving through a position on the route to which no light is emitted. In this way, the portable terminal 100 can increase variations of the game and the difficulty level of the game, thereby implementing a game that is worth playing even to skilled players.

The target object display unit 13 can display the target object 2 having a different form, in a different color, or having a different pattern, or in accordance with a combination thereof depending on the timing at which the target object 2 is to be displayed. For example, the target object display unit 13 may display the target object 2 such that the color of the target object 2 changes depending on a position to which light is emitted towards the target object 2. Alternatively, the target object display unit 13 may display the target object 2 such that the form of the target object 2 changes depending on a route along which the target object 2 moves. In this way, the portable terminal 100 can further increase variations of the game.

The target object display unit 13 can display the target object 2 such that part or all of an image that represents the target object 2 is distorted and is difficult to view as if the target object 2 is sunk in water. In this case, the target object display unit 13 can display the target object 2 such that the color of the target object 2 gradually becomes clear or the color and/or the form of the target object 2 changes as the target object 2 is passing through a layer in which the image of the target object 2 is distorted. In this way, the portable terminal 100 can further increase variations of the game.

Furthermore, the target object display unit 13 can display the target object 2 such that only a mirror image of the target object 2 is visible. In this way, the portable terminal 100 can increase variations of the game and the difficulty level of the game, thereby implementing a game that is worth playing even to skilled players.

As described above with respect to the exemplary embodiments, in the portable terminal 100, the game can be designed to increase the difficulty level of the game as well as variations of the game, and therefore, the portable terminal 100 can provide a game that is worth playing even to skilled players.

Figure 8:
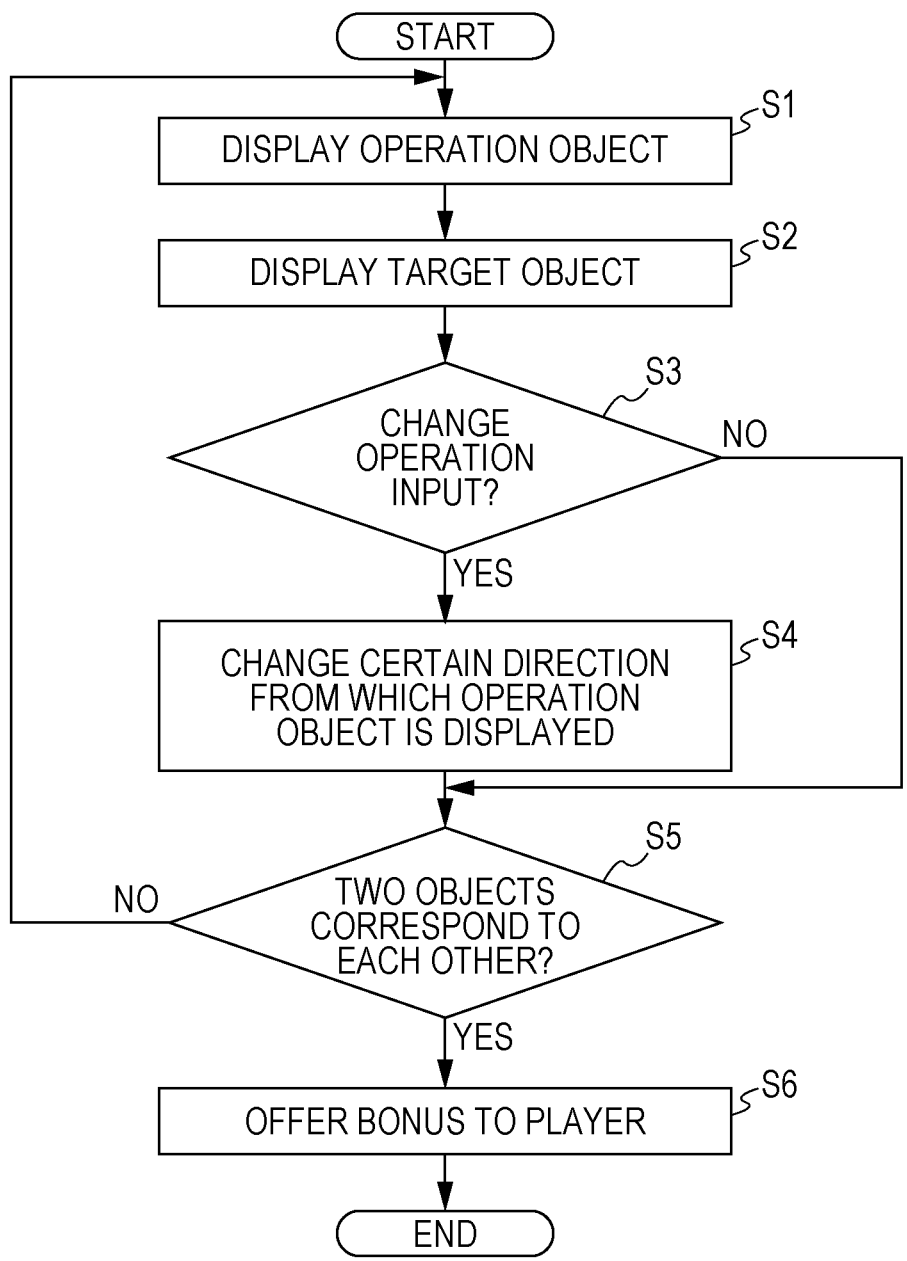
FIG. 8 is a flowchart illustrating an example of a process performed by the portable terminal.

Exemplary FIG. 8 is a flowchart illustrating an example of a process performed by the portable terminal 100. In a description given below, steps described in parentheses are steps included in a control method for the computer.

The operation object display unit 12 can output the operation object display information 6b with which the operation object 1 having a certain form is displayed so as to be visible from a certain direction in the graphical scene of the game having three-dimensional information (step S1 or operation object display output step). Next, the target object display unit 13 can output the target object display information 6c with which the target object 2 having a form relating to the certain form is displayed (step S2, target object display output step).

If the input obtaining unit 18 obtains the change information 5c (Yes in step S3), the viewpoint change unit 11 can change the certain direction from which the operation object 1 is displayed (the attitude of the operation object 1) in accordance with the change information 5c (step S4). Next, the matching determination unit 14 can determine whether the operation object 1 and the target object 2 correspond to each other (step S5 or form determination step). If it is determined that the two objects correspond to each other (Yes in step S5), the bonus offering unit 15 can offer a certain bonus to the player (step S6).

Note that the exemplary above-described control method may include any process performed by the units included in the control unit 10 in addition to the process described above with reference to FIG. 8.

As described above, the portable terminal 100 can display the operation object 1 having a certain form so as to be visible from a certain direction in the graphical scene of the game having three-dimensional information, display the target object 2 having a form relating to the certain form, and determine whether the two objects correspond to each other. Accordingly, the portable terminal 100 can produce an effect of providing a game that is a quick enjoyable game and that has certain attractiveness due to three-dimensional display.

A configuration has been described in the exemplary embodiments above where the computer described herein may function as the portable terminal 100, and the game program according to the exemplary embodiments may be executed on the portable terminal 100 as a native application (native game). On the other hand, part or all of the game program described herein may be executed on the server apparatus 200 as a Web application (Web game), and a result of a process that has been performed may be returned to the portable terminal 100.

Figure 9:
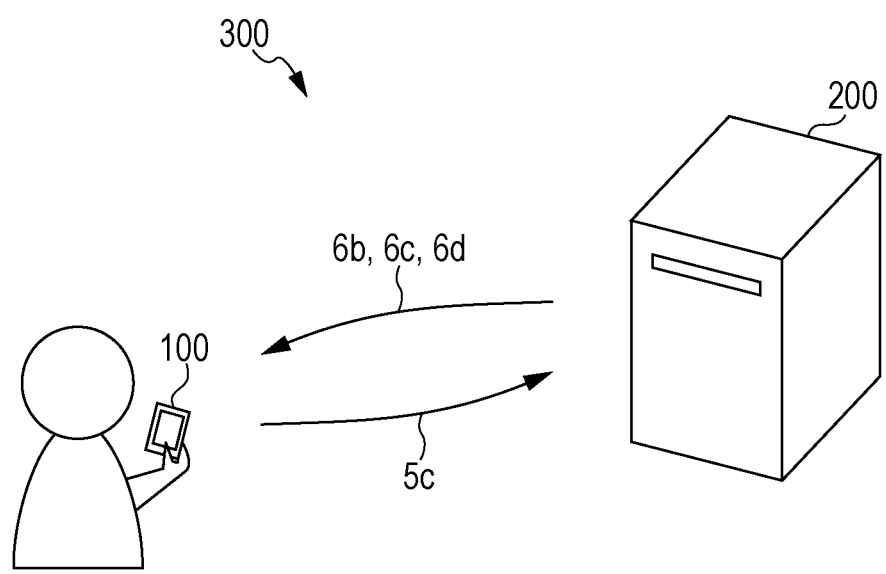
FIG. 9 is a schematic diagram illustrating a configuration of a game system that includes the portable terminal and a server apparatus according to an exemplary embodiment.

Exemplary FIG. 9 is a schematic diagram illustrating a configuration of a game system 300 that includes the portable terminal 100 and the server apparatus 200. As illustrated in exemplary FIG. 9, a case is described where the computer according to exemplary embodiments functions as the server apparatus 200 that is connected to the portable terminal 100 over a certain network so as to enable communication, and the game program according to the exemplary embodiments is executed on the server apparatus 200.

In this example, the server apparatus 200 can receive the change information 5c from the portable terminal 100 operated by the player (that is, input into the portable terminal 100 by the player). The operation object display unit 12 included in the server apparatus 200 can generate, on the basis of the change information 5c, the operation object display information 6b with which the operation object 1 having a certain form is displayed so as to be visible from a certain direction in the graphical scene of the game having three-dimensional information, and output (transmit) the operation object display information 6b to the portable terminal 100.

Next, the target object display unit 13 included in the server apparatus 200 can generate the target object display information 6c with which the target object 2 having a form relating to the certain form is displayed, and transmits (outputs) the target object display information 6c to the portable terminal 100. The matching determination unit 14 included in the server apparatus 200 can determine whether the operation object 1 and the target object 2 correspond to each other by comparing the form of the operation object 1 with the form of the target object 2, and can transmit (output) the determination information 6d that includes a result of determination to the portable terminal 100.

The portable terminal 100 can display, on the display unit 50, a result of playing the game (the operation object 1 and the target object 2, for example) on the basis of the information received from the server apparatus 200 (the operation object display information 6b, the target object display information 6c, and the determination information 6d, for example). Note that, in a case of displaying the result of playing the game using a Web browser, the portable terminal 100 can accumulate information received from the server apparatus 200 in a certain storage area (Web storage area) provided to the Web browser, for example.

As described in the examples above, a configuration can be employed in which some or all of the above-described units (for example, the viewpoint change unit 11, the operation object display unit 12, the target object display unit 13, the matching determination unit 14, the bonus offering unit 15, the object moving unit 16, the limitation unit 17, the input obtaining unit 18, the acceleration obtaining unit 19, and the display processing unit 20), which are assumed to be included in the portable terminal 100, may be included in the server apparatus 200, and the server apparatus 200 can transmit an output result of the game to the portable terminal 100 on the basis of input into the portable terminal 100. Accordingly, the server apparatus 200 can produce the same effect as the portable terminal 100 produces when the portable terminal 100 provides the above-described functions.

It may also be noted that the game may be a hybrid game for which the server apparatus 200 and the portable terminal 100 perform respective portions of the process. For example, a screen on which the game proceeds may be displayed on the portable terminal 100 on the basis of data generated by the server apparatus 200, that is, by way of Web display, and other screens, such as a menu screen, may be displayed by a native application installed on the portable terminal 100, that is, by way of native display.

Even if, for example, the game program according to exemplary embodiments is implemented as a native application that is executed on the portable terminal 100, the portable terminal 100 can access the server apparatus 200 as needed, and download and use information relating to the progress of the game (information about the player, information about other players who are friends of the player, information about accumulated points, items, and characters offered to the player, and ranking information about the player, for example). Furthermore, multi-playing of the game is possible in which the portable terminal 100 and another portable terminal 100 are connected to each other so as to enable communication (peer-to-peer communication) and operate in synchronization with each other.

A control block (specifically, the control unit 10) of the portable terminal 100 or the server apparatus 200 may be implemented as a logic circuit (hardware) formed in an integrated circuit (IC) chip or the like or as software by using a central processing unit (CPU). In the latter case, the portable terminal 100 or the server apparatus 200 can include a CPU that executes instructions of the game program, which is software for implementing the individual functions, a read-only memory (ROM) or a storage device (referred to as "recording medium") to which the game program and various types of data are recorded so as to be readable by a computer (or CPU), a random access memory (RAM) to which the game program is loaded, and the like. By the computer (or CPU) reading the game program from the recording medium and executing the game program, objectives of exemplary embodiments described herein may be attained. As the recording medium, a "non-transitory tangible medium" or "non-transitory storage medium", such as a tape, a disc, a card, a semiconductor memory, a programmable logic circuit, or the like, can be used. In addition, the game program may be provided to the computer via any transmission medium (communication network or broadcast wave, for example) capable of transmitting the game program. The present invention can be implemented as a data signal on a carrier wave where the game program is embodied by way of electronic transmission.

For example, the game program according to embodiments described herein can cause a computer (portable terminal 100 or server apparatus 200) to execute the operation object display output function, the target object display output function, the form determination function, the viewpoint change function, the acceleration obtaining function, the limitation function, the object moving function, the bonus offering function, and the game proceeding function. The operation object display output function, the target object display output function, the form determination function, the viewpoint change function, the acceleration obtaining function, the limitation function, the object moving function, the bonus offering function, and the game proceeding function can be respectively implemented by the operation object display unit 12, the target object display unit 13, the matching determination unit 14, the viewpoint change unit 11, the acceleration obtaining unit 19, the limitation unit 17, the object moving unit 16, the bonus offering unit 15, and the bonus offering unit 15 described above. The details of the functions are as described above.

The game program can be written in, for example, a script language such as, but not limited to, ActionScript or JavaScript (registered trademark), an object-oriented programming language such as Objective-C or Java (registered trademark), or a markup language such as HyperText Markup Language 5 (HTML5). The game system 300 that includes an information processing terminal (portable terminal 100, for example) including units which implement some functions implemented by the game program and the server apparatus 200 including units which implement the remaining functions different from the functions implemented by the units of the information processing terminal is also within the scope of the present invention.

The present invention is not limited to the embodiment described above and can be variously altered within the scope defined by the appended claims, and embodiments obtained by suitably combining technical means disclosed in different embodiments are also within the technical scope of the present invention. Further, a new technical feature can be formed by combining technical means disclosed in different embodiments.

The present invention may provide a game program that causes a computer to implement an operation object display function, a viewpoint change function, a target object display function, and a matching determination function. The operation object display function is a function of displaying, in a graphical scene of a game having three-dimensional information, an operation object that is oriented in a first orientation so as to be visible from a first direction, the operation object having a certain form. The viewpoint change function is a function of changing at least one of the first direction from which the operation object is visible and the first orientation in which the operation object is oriented, in accordance with information about a change operation obtained from a player via an input unit. The target object display function is a function of displaying, in the graphical scene of the game, a target object that is oriented in a second orientation so as to be visible from a second direction, the target object having a form similar to the certain form. The matching determination function is a function of determining that the operation object matches the target object if the operation object viewed from the first direction and oriented in the first orientation matches the target object viewed from the second direction and oriented in the second orientation.

The present invention is widely applicable to any computers, such as smartphones, tablet terminals, portable telephones, home video game machines, personal computers, server apparatuses, workstations, or mainframes.

What is claimed is:

1. A computer implemented method for providing a game program, comprising executing on a processor the steps of:
   outputting operation object display information from an operation object display output unit in a control unit of a computer with which an operation object having a certain form is displayed on a display unit, the operation object configured to be displayed, in a graphical scene of a game having three-dimensional information, in at least a first direction and a second direction, the display of the operation object in the first direction comprising a display of a first face of each of a plurality of object elements and the display of the operation object in the second direction comprising a display of a second face of each of a plurality of object elements;
   outputting target object display information from a target object display output unit in the control unit of the computer with which a target object having a form relating to the certain form is displayed;
   determining whether the operation object and the target object correspond to each other with a matching determination unit in the control unit of the computer by comparing the form of the operation object with the form of the target object; and
   changing, by a viewpoint changing unit in the control unit of the computer, a certain direction in accordance with information about a change operation obtained from a player via an input provided on an input unit wherein the viewpoint change unit changes the certain direction so as to make at least one face of the operation object face forward and so as to make a previous forward-facing face face other than forward, and to orient at least one side of the operation object up.

2. The computer implemented method for providing a game program according to claim 1, further comprising executing on a processor the step of:

obtaining, from an acceleration obtaining unit in the control unit of the computer, information about an acceleration, measured by an acceleration measurement unit of the computer, to which a terminal operated by the player is being subjected as the information about a change operation which is obtained via the input unit, wherein the viewpoint change unit changes the certain direction in accordance with the information about an acceleration obtained by the acceleration obtaining unit.

3. The computer implemented method for providing a game program according to claim 1, further comprising executing on a processor the step of:

placing a limitation, by a limitation unit in the control unit of the computer, on a time period during which the certain direction is changeable by at least one of the viewpoint change unit and a number of times the certain direction is changeable by the viewpoint change unit.

4. The computer implemented method for providing a game program according to claim 3, wherein the limitation unit sets a time based on a speed at which at least one of the operation object and the target object moves and a distance from the operation object to the target object as a time limit.

5. The computer implemented method for providing a game program according to claim 1, wherein the matching determination unit determines whether the operation object and the target object correspond to each other by comparing the form of the operation object with the form of the target object and determining whether one of the operation object and the target object fits into the other.

6. The computer implemented method for providing a game program according to claim 1, further comprising executing on a processor the step of:

moving, by an object moving unit in the control unit of the computer, at least one of the operation object and the target object along at least one of three axes of three dimensions so as to make the operation object and the target object approach each other.

7. The computer implemented method for providing a game program according to claim 1, further comprising executing on a processor the step of:

offering a certain bonus, by a bonus offering unit in the control unit of the computer, to a player in a case where the form determination unit determines that the operation object and the target object correspond to each other.

8. The computer implemented method for providing a game program according to claim 1, further comprising executing on a processor the step of:

making, by a game proceeding function in the bonus offering unit, another game relating to the game proceed in a case where the form determination unit determines that the operation object and the target object correspond to each other.

9. The computer implemented method for providing a game program according to claim 1, wherein at least one of the operation object and the target object are each constituted by a plurality of object elements, and each of the plurality of object elements is associated with attribute information.

10. The game program according to claim 9, wherein the attribute information is information indicating at least one of a form, a color, a pattern, and a combination thereof of each of the plurality of object elements.

11. The computer implemented method for providing a game program according to claim 1, wherein the operation object display output unit further outputs other operation object display information with which the operation object is displayed so as to be visible from another direction different from the certain direction.

12. The computer implemented method for providing a game program according to claim 1, further comprising executing on a processor the step of:

providing a puzzle game in which a player matches the operation object with the target object by determining the certain direction.

13. A non-transitory computer readable medium for providing a game and control of a computer, that, when executed on a processor, perform the steps of:

outputting, on a display unit, operation object display information with which an operation object having a certain form is displayed by a display processing unit, the operation object configured to be displayed, in a graphical scene of a game executed by a processor on a computer having three-dimensional information, in at least a first direction and a second direction, the display of the operation object in the first direction comprising a display of a first face of each of a plurality of object elements and the display of the operation object in the second direction comprising a display of a second face of each of a plurality of object elements;

outputting, to the display processing unit, target object display information determined by a target object display unit with which a target object having a form relating to the certain form is displayed on the display unit;

determining whether the operation object and the target object correspond to each other by comparing the form of the operation object with the form of the target object by a matching determination unit; and changing, by a viewpoint changing unit in the control unit of the computer, a certain direction in accordance with information about a change operation obtained from a player via an input provided on an input unit wherein the viewpoint change unit changes the certain direction so as to make at least one face of the operation object face forward and so as to make a previous forward-facing face face other than forward, and to orient at least one side of the operation object up.

14. A computer system for providing a game program, comprising:

a computer having at least one processor, at least one memory, and a display, the computer further comprising:

an operation object display output unit that outputs operation object display information with which an operation object having a certain form is displayed, the operation object configured to be displayed, in a graphical scene of a game having three-dimensional information, in at least a first direction and a second direction, the display of the operation object in the first direction comprising a display of a first face of each of a plurality of object elements and the display of the operation object in the second direction comprising a display of a second face of each of a plurality of object elements;
a target object display output unit that outputs target object display information with which a target object having a form relating to the certain form is displayed;
a form determination unit that determines whether the operation object and the target object correspond to each other by comparing the form of the operation object with the form of the target object; and
a viewpoint changing unit that changes a certain direction in accordance with information about a change operation obtained from a player via an input provided on an input unit wherein the viewpoint change unit changes the certain direction so as to make at least one face of the operation object face forward and so as to make a previous forward-facing face face other than forward, and to orient at least one side of the operation object up.

* * * * *